(12) United States Patent
Hunziker

(10) Patent No.: US 10,713,450 B2
(45) Date of Patent: Jul. 14, 2020

(54) AMBIENT BACKSCATTER COMMUNICATION WITH DEVICES HAVING A CIRCUIT CARRIER WITH EMBEDDED COMMUNICATION EQUIPMENT

(71) Applicant: AT & S Austria Technologie & Systemtechnik Aktiengesellschaft, Leoben (AT)

(72) Inventor: Urs Hunziker, Meilen (CH)

(73) Assignee: AT&S Austria Technologie & Systemtechnik Aktiengesellschaft, Leoben (AT)

( * ) Notice: Subject to any disclaimer, the term of this patent is extended or adjusted under 35 U.S.C. 154(b) by 8 days.

(21) Appl. No.: 15/868,790

(22) Filed: Jan. 11, 2018

(65) Prior Publication Data
US 2018/0196974 A1    Jul. 12, 2018

(30) Foreign Application Priority Data
Jan. 12, 2017    (EP) .................................. 17151269

(51) Int. Cl.
*G06K 7/10* (2006.01)
*H01Q 21/29* (2006.01)
(Continued)

(52) U.S. Cl.
CPC ..... *G06K 7/10316* (2013.01); *G06K 7/10366* (2013.01); *G06K 19/07749* (2013.01);
(Continued)

(58) Field of Classification Search
CPC .......... G03F 7/16; G03F 7/167; G03F 7/2043; H01L 21/3081; H01L 21/31144;
(Continued)

(56) References Cited

U.S. PATENT DOCUMENTS

| 5,995,006 A | 11/1999 | Walsh |
| 6,559,798 B1 | 5/2003 | Marumoto et al. |

(Continued)

FOREIGN PATENT DOCUMENTS

| CN | 101909408 A | 12/2010 |
| EP | 1613123 A1 | 1/2006 |

(Continued)

OTHER PUBLICATIONS

Liu et al., Ambient Backscatter: Wireless Communication Out of Thin Air, SIGCOMM'13, Aug. 12-16, 2013, Hong Kong, China, pp. 1-13.

(Continued)

*Primary Examiner* — Hirdepal Singh
(74) *Attorney, Agent, or Firm* — Robert A. Blaha; Smith Tempel Blaha LLC

(57) ABSTRACT

An ambient backscatter (transmit) communication device includes (a) an antenna arrangement for scattering electromagnetic radiation towards a receive communication device; (b) an electronic circuit having a modulator unit for modulating an impedance of the antenna arrangement in accordance with pieces of information to be communicated; and (c) a component carrier. At least a part of the antenna arrangement and/or the electronic circuit is embedded within the component carrier. An ambient backscatter (receive) communication device includes (a) an antenna arrangement for receiving ambient backscattered radiation; (b) an electronic circuit having a demodulator unit for demodulating the received ambient backscattered radiation to retrieve pieces of information; and (c) a component carrier. At least a part of the antenna arrangement and/or the electronic circuit is embedded within the component carrier. Furthermore are described a communication system and a method (Continued)

for transferring pieces of information by ambient backscattering.

19 Claims, 4 Drawing Sheets

(51) Int. Cl.
    *G06K 19/077* (2006.01)
    *H01Q 13/06* (2006.01)
    *H01Q 3/34* (2006.01)
    *H01Q 21/06* (2006.01)
(52) U.S. Cl.
    CPC .............. *H01Q 3/34* (2013.01); *H01Q 13/06* (2013.01); *H01Q 21/064* (2013.01); *H01Q 21/29* (2013.01)
(58) Field of Classification Search
    CPC ........... H01L 21/32139; Y10S 438/908; Y10T 29/41; G06K 19/07; G06K 7/10316; G06K 7/10366; H01Q 13/06; H01Q 21/064; H01Q 21/29; H01Q 3/34
    USPC ......................................................... 340/10.1
    See application file for complete search history.

(56) References Cited

U.S. PATENT DOCUMENTS

| | | | |
|---|---|---|---|
| 7,098,850 B2 * | 8/2006 | King | B65D 5/4233 340/572.1 |
| 8,933,788 B2 * | 1/2015 | Hinman | G06K 7/10079 340/10.1 |
| 9,196,951 B2 | 11/2015 | Baks et al. | |
| 9,489,606 B1 * | 11/2016 | Korhummel | H01Q 1/2225 |
| 10,312,596 B2 * | 6/2019 | Gregoire | H01Q 13/206 |
| 2006/0001525 A1 * | 1/2006 | Nitzan | G06K 19/0702 340/10.1 |
| 2008/0062044 A1 * | 3/2008 | Al-Mandawi | H01Q 1/2225 343/700 MS |
| 2008/0180253 A1 * | 7/2008 | Ovard | G06K 7/0008 340/572.4 |
| 2010/0033709 A1 | 2/2010 | Lampin et al. | |
| 2010/0127084 A1 * | 5/2010 | Pavate | G06K 19/07749 235/492 |
| 2012/0056796 A1 | 3/2012 | Kato et al. | |
| 2014/0145883 A1 | 5/2014 | Baks et al. | |
| 2015/0054621 A1 * | 2/2015 | Lin | G06K 19/0717 340/10.1 |
| 2015/0123341 A1 | 5/2015 | Hirata et al. | |
| 2015/0311944 A1 | 10/2015 | Gollakota et al. | |
| 2016/0092706 A1 * | 3/2016 | Deyle | H04B 5/0031 340/10.1 |
| 2016/0292470 A1 * | 10/2016 | Friedman | G06K 7/1097 |
| 2016/0365890 A1 * | 12/2016 | Reynolds | H04B 1/18 |
| 2017/0180178 A1 * | 6/2017 | Gollakota | H04K 3/25 |

FOREIGN PATENT DOCUMENTS

| | | |
|---|---|---|
| EP | 1613134 A2 | 1/2006 |
| EP | 1713022 A1 | 10/2006 |
| EP | 2141970 A1 | 1/2010 |
| JP | 2013247494 A | 12/2013 |
| KR | 20100056004 A | 5/2010 |
| WO | WO2012036844 A1 | 3/2012 |
| WO | 2015/123306 A1 | 8/2015 |
| WO | WO2015123341 A1 | 8/2015 |

OTHER PUBLICATIONS

Rep. ITU-R M.2078, Estimated Spectrum Bandwidth Requirements for the Future Development of IMT-2000 and IMT-Advanced, 2006, pp. 1-86.

Husinsky, Wolfgang; Laser Pulses Generate Nano-Antennas; Press Release, Vienna University of Technology, Jun. 2, 2014, pp. 1-3; Vienna, Austria.

* cited by examiner

AMBIENT BACKSCATTER COMMUNICATION WITH DEVICES HAVING A CIRCUIT CARRIER WITH EMBEDDED COMMUNICATION EQUIPMENT

CROSS-REFERENCE TO RELATED APPLICATION

This application claims the benefit of the filing date of the European Patent Application No. 17 151 269.2 filed 12 Jan. 2017, the disclosure of which is hereby incorporated herein by reference.

TECHNICAL FIELD

Embodiments of the present invention generally relate to the field of radio communication between different communication devices. In particular, the embodiments of the present invention relate to communication devices and to a communication system, which are capable of participating in and/or carrying out an ambient backscatter communication. Further, the embodiments of the present invention relate to a method for transferring pieces of information between a transmit communication device and a receive communication device by means of ambient backscatter communication.

BACKGROUND

Ambient backscatter is a radio communication principle that allows communication devices to communicate respectively to transfer data or pieces of information by backscattering ambient radiofrequency (RF) electromagnetic radiation which has been generated by means of a radio radiation source external to the communication devices.

When transferring information by means of ambient backscatter communication a time varying backscattering of electromagnetic radiation is achieved by changing the impedance of an antenna arrangement under the influence of electromagnetic radiation which is present "within the air". This means that at least a part of the electromagnetic radiation "within the air" impinges onto a transmit communication device which is supposed to transmit the pieces of information to a receive communication device.

The physical principle of ambient backscatter communication can be understood when recognizing that generally when a wave encounters a boundary between two media that have different impedances/densities, the wave is reflected back at least partially. The amount of reflection is typically determined by the difference in the impedance/density values. In case of acoustic waves the acoustic impedance is the relevant property of the two media having the boundary in between. In case of electromagnetic waves the electric impedance is the relevant property of the media defining the boundary. By modulating the electrical impedance (at the port) of the antenna arrangement of the transmit communication device in accordance with pieces of information to be transmitted one automatically modulates the amount of RF energy that is scattered towards the receive communication device. Be demodulating the received scattered electromagnetic radiation one can retrieve the pieces of information.

Another approach for understanding the physical principle of ambient backscatter communication is by considering that the electromagnetic radiation being present "within the air" is attenuated with a time varying pattern by means of the transmit communication device. Thereby, the time varying pattern is associated with the pieces of information which are supposed to be transferred. The receive communication device recognizes the corresponding time varying attenuation of the "within the air" electromagnetic radiation and retrieves, based on the recognized time pattern, the pieces of information.

By contrast to known transponder technologies, i.e. Radio Frequency Identification (RFID) technology, ambient backscatter communication does not require a transmit system, which emits electromagnetic waves. By contrast thereto, ambient backscatter communication is based on a modulated attenuation of an electromagnetic wave being within space. This has the effect that with ambient backscatter communication both the transmit communication device and the receive communication device do not require any power for generating electromagnetic waves. Only a minimum of power is needed for generating (by the transmit communication device) and for receiving (by the receive communication device) the time modulated attenuation.

WO 2015/123341 A1 and US 2015/0311944 A1 disclose devices among which pieces of information can be transmitted by means of an ambient backscatter communication.

One "apparatus problem" with ambient backscatter communication is that at the transmit side there must be a strong electromagnetic coupling between (a) the ("driving") electromagnetic radiation being present in space respectively "in the air" and (b) an antenna arrangement of the receive communication device for providing an efficient modulation of attenuation. On the receive side at the receive communication device electronic circuits, which have to perform in particular a demodulation procedure, are subjected to the electromagnetic radiation being present in space. This typically results in an unwanted electromagnetic interference (EMI) which may negatively impact the operation of the electronic circuit, which in turn diminishes the quality of the received signals representing the transferred pieces of information.

Further, in particular with small communication devices (the electronic components of) the electronic circuits provide for an unwanted shielding of the antenna arrangement at least with respect to certain directions. On the transmit side this shielding of the antenna arrangement may affect the "driving" electromagnetic radiation being present in space and the backscattered (time modulated) radiation. On the receive side a shielding of the antenna arrangement yields a (time independent) attenuation of the ambient backscatter radiation which can be picked up. These shielding impacts increase when the electronic circuits are located close to the antenna structures. On the other hand, if the electronic circuits are located "far away" from the antenna arrangement, due to a correspondingly large length of electric wiring between the respective electronic circuit and the antenna structure, the SNR decreases. As a consequence, the quality of ambient backscatter communication is reduced.

SUMMARY

There may be a need for improving the quality of ambient backscatter communication.

This need may be met by the subject matter according to the independent claims. Advantageous embodiments of the present invention are described by the dependent claims.

According to an aspect there is provided a communication device for participating in an ambient backscatter communication as a transmit communication device. The provided communication device comprises (a) an antenna arrangement configured for scattering electromagnetic radiation, which has been emitted by a radio radiation source, towards a receive communication device; (b) an electronic circuit having a modulator unit coupled with the antenna arrangement and configured for modulating an impedance of the antenna arrangement in accordance with pieces of information to be transferred from the transmit communication device to the receive communication device; and (c) a component carrier. At least a part of the antenna arrangement and/or at least a part of the electronic circuit is embedded within the component carrier.

The described transmit communication device is based on the idea that by integrating at least partially at least a part of the RF equipment, which is used for providing a modulated attenuation of the electromagnetic radiation being emitted by the radio radiation source, into the component carrier, wiring distances between the antenna arrangement and the electronic circuit can be minimized. As a consequence, a large SNR can be realized. Further, when integrating both the antenna arrangement and the electronic circuit at least partially into the component carrier, an unwanted shielding of the antenna arrangement by means of (the bodies of) electronic components of the electronic circuit can be reduced because these equipment parts of the transmit communication device, which parts are needed (on the transmit side) for ambient backscatter communication, can be arranged close to each other within at least approximately the same plane being defined by the component carrier. In other words, by arranging both the antenna arrangement and the electronic circuit within one and the same plane the three dimensional angular range or the solid angle within which an unwanted shielding of the antenna arrangement by means of the component bodies of the electronic circuit takes place can be minimized.

In view of the technical considerations presented above it should be clear that the described transmit communication device may be realized with a large SNR when generating the time modulated attenuation respectively the time modulated ambient backscatter signal carrying the pieces of information to be transmitted to the receive communication device. Further, the solid angle for efficiently receiving the driving electromagnetic radiation and for emitting the ambient backscatter radiation will be large.

The antenna arrangement can be formed not only at an upper, lower and/or lateral side of a component carrier but in particular at least partially within (the 3D dimensions of) the base structure. In the latter design the antenna arrangement is at least partially embedded within the component carrier. This automatically results in a protection from external mechanical impacts. As a consequence, a high robustness of the described component device can be achieved.

The component carrier may be any type of support element, preferable a flat support element, which is capable of receiving the antenna arrangement and/or the electronic circuit in an embedded manner. The component carrier may be e.g. a printed circuit board, a substrate or any other type of support element, which can be used for building up electronic assemblies. The base structure may comprise at least one dielectric layer and a metallic layer, which is attached at the dielectric layer. The metallic layer may be patterned or structured in order to form appropriate signal traces for (i) connecting the described antenna arrangement with the described electronic circuit and/or for (ii) electrically connecting components of such an electronic assembly.

The antenna arrangement may be formed from an electrically conductive material. Alternatively or in combination it may be formed by a recess or a slot formed within a structure made from an electrically conductive material. Such a structure may be for instance a hollow conductor. In this case the antenna arrangement may be denominated a slot antenna (element).

The conductive material may be any material which provides for an electric conductivity which is sufficient such that the described antenna arrangement is usable for a wireless radio communication. Apart from a metallic material also other conductive materials can be used such as e.g. conductive carbon, a semiconductor material (e.g. optically transparent Indium gallium zinc oxide) or adhesive plaster with metallic stripes (e.g. silver stripes). Further, Diamond Like Carbon (DLC) layers, carbon monolayers (graphene) or a mixture of binder and metallic/conductive particles (so called conductive ink) may be used as the conductive material. In case the conductive material of the antenna arrangement is a metallic material this metallic material may be preferably the same material as the material being used for the (at least one) metallic layer of the component carrier. This may provide the advantage that the antenna arrangement can be formed in an easy manner already during a fabrication of the component carrier. Preferably, the metallic material comprises copper or is copper. Of course, also another material with a higher conductivity than copper such as gold or carbon nanotubes (CNT) may be used.

According to an embodiment the (transmit) communication device further comprises a demodulator unit coupled with the antenna arrangement and configured for demodulating received ambient backscattered radiation from another communication device to retrieve pieces of information which have been transferred from the another communication device.

Descriptively speaking, the described communication device has not only the ability to transmit ambient backscatter radiation but also to receive ambient backscatter radiation. As a consequence, the communication device can act as a transceiver participating in an ambient backscatter communication.

Transmitting and receiving pieces of information by means of ambient backscatter may be realized in a half-duplex mode. This means that transmitting and receiving cannot be accomplished simultaneously. Also this seems to be a disadvantage, realizing a half-duplex ambient backscatter communication device may be easier and may involve less RF communication equipment than a full-duplex ambient backscatter communication device.

In other embodiments the described communication device is realized as a full-duplex device. For realizing such a full-duplex device a further antenna arrangement may be provided. In the context of the wording used above for defining the communication device the further antenna arrangement may be only a part of the antenna arrangement described above. This means that the above described antenna arrangement comprises two parts, one for transmitting and one for receiving. However, preferably only the described one antenna arrangement is used both for transmitting and for receiving ambient backscattered radiation.

In this respect it is mentioned that for a full-duplex communication transmitting and receiving may be accomplished preferably at different (baseband) frequencies. In ambient backscatter communication the radio radiation source may be configured to emit electromagnetic radiation having spectral components including these frequencies. According to other in principle known approaches a full-duplex communication a transmit communication channel is spatially separated from a receive communication channel, wherein this spatial separation is realized by a pronounced directional selectivity. A pronounced directional selectivity can be provided in particular when arranging the respective antenna arrangements in a common plane at or within a component carrier which allows for a minimal interference between the transmit channel and the receive channel.

The another communication device operates as a transmit communication device using ambient backscatter for providing pieces of information to the described transceive communication device. Thereby, the respective transmit channel and the respective receive channel may be respectively associated with different wavelengths or frequencies.

The demodulator unit may be a part of the described electronic circuit. Alternatively, a further electronic circuit may be used for including the described demodulator unit. In the latter case also the further electronic circuit may preferably be integrated or embedded at least partially within the component carrier.

According to a further embodiment the communication device further comprises a sensor unit, which is coupled with the electronic circuit. The sensor unit is configured for sensing the value of a physical quantity, in particular from the environment of the communication device. Further, the pieces of information include the sensed value.

The sensed value may be forwarded to the receive communication device in an autonomous manner. Thereby, forwarding a sensed value may be carried out in an autonomous manner, e.g. triggered when the sensed value is within a predetermined range. Alternatively and or in combination forwarding sensed values may be accomplished cyclically and/or upon request from an external entity, in particular from the receive communication device.

Of course, also transmitting the pieces of information may also be accomplished upon request (i.e., using a "pull-principle" instead of "push-principle"). Examples for sensed physical quantities may be e.g. a signal indicating air pressure, temperature, water or fluid levels, currents, etc.

According to a further aspect there is provided a communication device for participating in an ambient backscatter communication as a receive communication device. The (receive) communication device comprises (a) an antenna arrangement configured for receiving ambient backscattered radiation from a transmit communication device; (b) an electronic circuit having a demodulator unit coupled with the antenna arrangement and configured for demodulating the received ambient backscattered radiation to retrieve pieces of information which have been transferred from the transmit communication device to the receive communication device; and (c) a component carrier; wherein at least a part of the antenna arrangement and/or at least a part of the electronic circuit is embedded within the component carrier.

Also the described (receive) communication device is based on the idea that an integration of RF equipment into the component carrier may contribute to a high quality of ambient backscatter communication.

According to a further embodiment the communication device further comprises a modulator unit coupled with the antenna arrangement and configured for modulating an impedance of the antenna arrangement in accordance with pieces of information to be transferred to another communication device.

Descriptively speaking, also the communication device described here has not only the ability to receive ambient backscatter radiation but also to transmit ambient backscatter radiation. As a consequence, also this communication device can act as a transceiver participating in a bidirectional ambient backscatter communication.

As has already been mentioned above also the described (receive) communication device may be configured for participating in a half-duplex or in a full-duplex ambient backscatter communication.

The modulator unit may be a part of the described electronic circuit. Alternatively, a further electronic circuit may be used for including the described modulator unit. In the latter case, also the further electronic circuit may preferably be integrated or embedded at least partially within the component carrier.

According to a further embodiment the antenna arrangement comprises at least a first antenna element and a second antenna element. The electronic circuit is operatively connected both with the first antenna element and with the second antenna element. Further, the electronic circuit is configured for (a) introducing a first phase shift for signals traveling between the electronic circuit and the first antenna element; and/or (b) introducing a second phase shift for signals traveling between the electronic circuit and the second antenna element.

The described antenna arrangement having at least two antenna elements each being assigned to one phase shift may be capable of communicating with a directional sensitivity. Thereby, the direction of a solid angle with an improved directional sensitivity is controllable by controlling at least one of these phase shifts. This basic principle of radio communication, which relies on interference effects between the (coherent) radiation being assigned to both antenna elements, is often called beamforming. Preferably, all antenna elements are formed at or are embedded within the component carrier such that the entire communication device can be realized within a compact design.

In other words, in accordance with basic physical principles a beamforming can be achieved by combining different signals being associated with different antenna elements in a phased array comprising at least the two antenna elements in such a way that signals at particular angles experience constructive interference while others experience destructive interference. Generally, antenna elements can be used both for transmitting and receiving electromagnetic signals such that beamforming can be applied both for transmitting and for receiving radio signals to or from preferred angular directions. In the present case where ambient backscatter communication is accomplished, by "phasing" the antenna elements in an appropriate manner the transmit communication device performs an absorption of electromagnetic radiation from the actually preferred angular direction. The receive communication device adjusts its directional main sensitivity, in accordance with usual direct signal radio communication, towards the transmit communication device.

With beamforming a varying directional sensitivity can be realized without mechanically varying the orientation of the antenna arrangement. This provides an important contribution for realizing the described communication devices with a compact design. Even more important, omitting a mechanical mechanism for changing the directional sensitivity of the antenna arrangement may result in improving significantly the mechanical robustness of the communication device.

In connection with ambient backscatter communication carrying out an appropriate beamforming procedure may further provide the advantage that an electromagnetic coupling between the antenna arrangement and the electromagnetic radiation in close proximity to the respective complication device can be strengthened. This may result (i) in an effective attenuation at the transmit side and/or (ii) in an effective reception of the ambient backscatter radiation originating from the transmit communication device. Further, beamforming may allow to minimize reflections of electromagnetic radiation within a spatial communication channel established between the transmit communication device and the receive communication device. Such reflections may be generated by any object, e.g. a building structure, which influences the propagation of electromagnetic waves, here the ambient backscatter radiation.

It is mentioned that in particular when antenna arrangement and the electronic circuit are located close to each other at or on the same component carrier, a beamforming procedure (adapting the directional sensitivity) can be carried out quickly. Specifically, with beamforming a directional sensitivity of 70%, 80%, 90% or even 97% with regard to the maximal possible directional sensitivity can be carried out within 10 s, in particular within 1 s, more in particular within 0.1 s, and even more particular within 0.01 s. This allows for a reliable ambient backscatter communication even when at least one of the two communication devices moves in space.

It is further mentioned that the antenna arrangement may be designed in such a manner that with respect to a hemisphere the solid angle, within which a gain of the antenna structure is within +−3 decibels may be at least 60%, in particular at least 80%, more in particular at least 90%, more in particular at least 95%, and even more particular at least 99%.

Each one of the described antenna elements may comprise two different portions. In this case a first portion is connected to a first terminal of the electronic circuit, which first terminal is assigned to the respective antenna element, and a second portion is connected to a second terminal of the electronic circuit, which second terminal is also assigned to this antenna element. This means that the electronic circuit comprises at least four terminals, two of them being assigned to the first antenna element and the other two of them being assigned to the second antenna element.

According to a further embodiment the two antenna elements are arranged within the same plane, in particular the two antenna elements are formed at or embedded in the component carrier. This may provide the advantage that a phased array of antenna elements can be built up in an easy and effective manner.

According to a further embodiment the electronic circuit comprises an active electronic component, which is embedded within the component carrier.

In this document the term "electronic component" has to be understood in a broad sense. For instance, the described electronic component may be realized by means of a single (active) electronic component part which is incorporated within a single housing or package. However, the electronic component may also comprise two (active) electronic component parts which operate in a coordinated manner. Thereby, a first electronic component part may be connected and/or assigned to the above mentioned first antenna element and the second electronic component part may be connected and/or assigned to the above mentioned second antenna element. Further, the electronic component may also comprise a plurality of electronic component parts wherein at least some of them are interconnected with each other in order to form an appropriate electronic circuitry. It is also possible that apart from at least one electronic component part there may be other component parts which are not embedded but, for instance surface mounted on the base structure.

The described active electronic component may be a "wireless communication component". This means that the active electronic component is capable of controlling, performing, and/or participating in a radio communication, wherein data are transferred in a wireless manner. The wireless communication component may be a component within a housing. Preferably, the (embedded) wireless communication component may be a bare die or a chip. Further, the wireless communication component may comprise appropriate electric circuits such as an electronic transmitting circuit and/or an electronic receiving circuit.

In this document the term "active electronic component" may denote an electronic component which, by contrast to a passive electronic component, relies on a source of energy (usually from a power supply, or from energy harvesting out of the/a radiation source) in order to inject electric power into an electronic circuit. Therefore, an active electronic component comprises at least three contact terminals for electrically contacting the same. Active electronic components include in particular at least one amplifying component such as for instance a transistor. An active electronic component may in particular comprise a semiconductor material.

In this document the term "embedded" may particularly denote that the respective element, i.e. one of the two antenna elements and the electronic component is located within an opening formed in or at the base structure. Thereby, the term "opening" may denote any type of recess or cavity formed in or at the base structure. The opening might even be a metallized via formed within the base structure, which metallized via connects different antenna element portions. In this case also the metallized via represents a portion of the respective antenna element.

It is pointed out that it is not necessary that the described openings are a free or unfilled (e.g. filled with air) openings. It is only necessary that during the manufacture of the described component carrier the respective opening is free or unfilled at least at a certain processing stage. In the final state of the electronic assembly the opening may be filled e.g. with a protective or any other functional material.

According to a further embodiment the communication device further comprises a shielding structure, which surrounds at least partially the embedded active electronic component. This may provide the advantage that interfering radiation which could disturb the operation of the active electronic component can be effectively reduced. In this way a negative radiative coupling between the antenna structure and (the embedded active electronic component of) the electronic circuit can be minimized.

The shielding structure may be made of any suitable (electrically conductive and/or ferro magnetic) material. Preferably, the shielding structure is a comparatively mechanical soft material such that it can also contribute to a smooth embedding of the electronic component. This may enhance the stability of the entire communication device because mechanical stress, which could be caused e.g. by different coefficients of thermal expansions and varying temperatures could be absorbed at least partially by the shielding structure.

The shielding structure may be configured such that a shielding between the antenna structure and the embedded electronic component will be more effective than a shielding towards or with respect to other directions. This may allow the establishment of a shielding in an easy and effective manner.

According to a further embodiment the antenna arrangement comprises (a) a first antenna assembly being formed at a first surface of the component carrier and (b) a second antenna assembly being formed at a second surface of the component carrier. Thereby, the second surface is opposite to the first surface. This may provide the advantage that the solid angle, within which ambient backscatter communication between two of such communication devices is possible, can be increased.

In this respect it is mentioned that using an embedded electronic component or, even better, an embedded electronic circuit as radio transmit/receive circuitry one may achieve a solid angle which corresponds to a full sphere. Thereby, each antenna assembly may cover one hemi sphere.

According to a further embodiment (a) the first antenna assembly comprises at least two first antenna elements and/or (b) the second antenna assembly comprises at least two second antenna elements. This may provide the advantage that for each antenna assembly being assigned to a certain solid angle (representing preferably a hemi sphere) a beam forming can be performed. In this context it should be clear that each one of the first/second antenna elements must be electrically connected with the radio transmit/receive circuitry in order to allow for an appropriate phasing of the different antenna elements.

According to a further embodiment the component carrier is a flexible component carrier or a semi-flexible component carrier.

In this document the term "flexible component carrier" may refer to any structure which is capable of receiving at least a part of the RF equipment and which comprises a material and/or a structure which provides for a certain mechanical flexibility. Descriptively speaking, a "flexible component carrier" may be (continuously) bended along at least one direction being parallel to a main plane of the component carrier. The term "semi-flexible component carrier" may refer to a component carrier which has both rigid and flexible portions.

Both the flexible component carrier and the semi-flexible component carrier may be a flex printed circuit board.

An at least partially flexible component carrier may be of particular advantage, if the described antenna arrangement is formed on and/or within the component carrier. This may enable the above described beam forming simply by means of bending the component carrier in an appropriate manner.

Further, an at least partially flexible component carrier may reduce mechanical stress introduced from an external source. Furthermore, also internal stress (e.g. thermally induced) can be compensated by appropriate internal compensation movements. This may allow for accommodating a plurality of electronic components (including the described electronic circuit) and/or the antenna arrangement (preferably comprising several antenna elements) with a high integration level density.

In an embodiment the transmit communication device may be realized within an adhesive plaster. In this way a movement of a person carrying the adhesive plaster will cause a dynamic bending of the component carrier. An antenna arrangement being formed within or at the component carrier will then dynamically change its form or shape. This results in a time varying beamforming. Descriptively speaking, by permanently varying the directional sensitivity of ambient backscatter communication the ambient space will be scanned and irrespective of the actual location of an ambient backscatter communication partner device a reliable ambient backscatter combination can be guaranteed.

According to a further embodiment the communication device further comprises an energy conversion arrangement, which is configured for converting provided external energy into internal energy used for driving the electronic circuit. This may provide the advantage that at least for the basic operation of the communication device there is no need for providing an energy source (e.g. a battery or a rechargeable accumulator).

Descriptively speaking, the described communication device is configured for performing a so called "energy harvesting", wherein energy being associated with an external energy source is used for operating the communication device.

In this context external energy is any type of energy or power, which is provided to the communication device from an energy or power source being external to the communication device. By contrast thereto, internal energy is any energy or power which is given within the described communication device and which is used for operating the same.

At this point it is mentioned that it is of course also possible to operate the communication device directly from internal electric energy which may be received from a (lifetime) battery, from a rechargeable battery, a (bio) fuel cell, etc.

According to a further embodiment the external energy is at least one of (a) electromagnetic energy, in particular from the electromagnetic radiation of the radio radiation source; (b) thermal energy, in particular thermal energy based on a temperature difference; (c) chemical energy, in particular based on different electrochemical potentials; and (d) mechanical energy.

Electromagnetic energy being provided in particular by the above described radio radiation source can be picked up by means of appropriate antenna structures. In some embodiments the described antenna arrangement can also be used for this electromagnetic energy harvesting. Such antenna structures and the respective energy harvesting are known e.g. from RFID devices. For the sake of conciseness of this document no further details are presented here. In other embodiments electromagnetic energy can be received by means of "optical" radiation being the infrared (IR), visible (VIS) and/or ultraviolet (UV) spectral regime. Appropriate energy conversion means may be e.g. a photodiode and/or a solar cell.

Thermal energy may be harvested for instance by means of a Peltier element. In this context a temperature difference will be needed between different portions of the described energy conversion arrangement.

Chemical energy may be received e.g. from perspiration of a human being operating the described communication device.

Mechanical energy may be received from any type of mechanical movement, acoustic noise, friction, gaseous and/or liquid fluid stream. Conversion can be realized e.g. by means of a piezo element, a generator being built up by Micro Electro Mechanical Systems (MEMS) technology. In preferred embodiments the transmit communication device comprises a push-button sensing device, wherein the external energy is provided by an operator applying a certain pressure onto a piezoelectric element, which converts the respective mechanical energy into electric energy which is used for operating the transmit communication device. Due to the small energy consumption for ambient backscatter comparatively small pressures corresponding to a weight of less than 100 g, preferably less than 50 g and more preferably less than 20 g may be sufficient.

According to a further aspect there is provided a communication system comprising (a) a radio radiation source being configured for emitting electromagnetic radiation; (b)

a transmit communication device described above; and (c) a receive communication device as described above.

Also this communication system is based on the idea that the above described transmit communication device and the above described receive communication device can be employed for performing a high quality ambient backscatter communication. Thereby, in accordance with embodiments of the invention described in this document, the quality of the ambient backscatter communication relies on the above elucidated embedding of at least a part of the RF equipment into the component carrier.

The described radio radiation source may be any type of radio transmitter such as a radar transmitter, a radio station, a television station, an access point of a cellular radio communication network, a wireless local area network (WLAN) device, a cellular phone, a near field communication (NFC) device, a ZigBee device, a Bluetooth device, etc.

Each one of the described entities of the communication system may receive electric power via a Power over Ethernet (PoE) cabling.

According to a further embodiment at least two of the transmit communication device, the receive communication device, and the radio radiation source are arranged within one electronic apparatus, in particular share one and the same component carrier, more in particular are formed within one electronic assembly on one shared component carrier.

Descriptively speaking, in the described embodiment the pieces of information are transferred within one more or less large electronic apparatus. This may provide the advantage that an "intra-apparatus" communication can be accomplished with a minimum amount of energy or power. Due to the wireless character the of the ambient backscattering communication principle the "intra-apparatus" communication can be realized with a minimum of wiring.

According to a further embodiment the communication system further comprises at least one further receive communication device as described above, which is communicatively connected with the transmit communication device by means of ambient backscatter radiation received from the transmit communication device. This may provide the advantage that broadcasting of pieces of information to several receive communication devices can be realized. Such a broadcasting by means of ambient backscatter communication may be carried out for instance for providing news in auditive and/or in visual form to a plurality of users each being equipped with a (further) receive communication device.

In this respect it is mentioned that in some applications broadcasting may be associated with data security issues. Such issues may be resolved by providing appropriate data access rights to one or more of a plurality of receive communication devices.

According to a further aspect there is provided a method for transferring pieces of information within a communication network which comprises (i) a radio radiation source; (ii) a transmit communication device as described above; and (iii) a receive communication device as described above. The provided method comprises (a) emitting, by means of the radio radiation source, electromagnetic radiation; (b) scattering, by means of the antenna arrangement of the transmit communication device, emitted electromagnetic radiation impinging onto the transmit communication device towards the receive communication device, wherein the scattering is modulated by the modulator unit with a time varying pattern of the impedance of the antenna arrangement of the transmit communication device, wherein the time varying pattern is indicative for the pieces of information; (c) receiving, by means of the antenna arrangement of the receive communication device, the scattered and modulated electromagnetic radiation; (d) demodulating, by means of the demodulator unit, the received scattered and modulated electromagnetic radiation; and (e) retrieving the pieces of information based on the result of demodulating.

Also the described method for transferring pieces of information is based on the idea that with the above described communication devices each having at least a part of its RF equipment integrated or embedded within a component carrier a high quality ambient backscatter communication can be realized.

The pieces of information can be transferred in a coded manner. In this way data security issues can be met.

Further, at least one of the transmit communication device and the receive communication device can be communicatively in contact with other communication systems or devices. In this case the at least one communication device can act as a relay node or a gateway.

According to a further embodiment the transmit communication device and the receive communication device are spatially separated from each other by a distance of less than 2000 m, in particular less than 200 m, more in particular less than 20 m, more in particular less than 2 m, and even more in particular less than 0.2 m.

According to a further embodiment the transmit communication device and/or the receive communication device operate with a power consumption of less than 100 µW ($100 \times 10^{-6}$ W), in particular less than 10 µW, more in particular less than 1 µW, and even more in particular less than 0.1 µW.

The described very small power consumption results from the basic principle of ambient backscatter communication according to which almost all energy being needed is provided by the radio radiation source. The only "thing" to do for the respective communication device is either to provide for a modulated attenuation at the transmit side and to demodulate the received ambient backscatter signal at the receive side.

According to a further embodiment the emitted electromagnetic radiation has a frequency bandwidth of less than 1 GHz, preferably less than 100 MHz, more preferably less than 10 MHz, more preferably less than 1 MHz, more preferably less than 100 kHz, and most preferably less than 10 kHz.

Using a narrow frequency bandwidth for the emitted electromagnetic radiation may provide the advantage that there will only be a small amount a radio energy which will not be used with the described method and which will only contribute to an electromagnetic pollution of the environment. In other words, a narrow bandwidth may increase the electromagnetic compatibility of the described method.

The emitted electromagnetic radiation may have for instance a frequency of 13.6 GHz and a power of 1 Watt which may be uniformly distributed within the respective frequency bandwidth. However, it should be clear that this is only an example and, depending on the specific application and on the available frequency slots, other frequencies and/or powers can be used.

According to a further embodiment modulating the impedance of the antenna arrangement of the transmit communication device comprises modulating a strength of absorption of at least a part of the emitted electromagnetic radiation with the time varying pattern.

According to a further embodiment modulating the impedance of the antenna arrangement of the transmit communication device comprises modulating a frequency of absorption of at least a part of the emitted electromagnetic radiation with the time varying pattern.

According to a further embodiment, at the transmit communication device, impedance values of the time varying pattern of the impedance are chosen such that a modulation depth of the entire radiation received by the receive communication device is maximized.

Descriptively speaking, by contrast to standard radio communication concepts, in particular standard radio communication concepts accomplishing a beamforming, an optimization respectively a maximization of the level respectively the strength of the received radio signal is not sought. The aim is rather to maximize the modulation factor respectively the range of variation of modulated entire electromagnetic radiation received by the receive communication device. In other words, the modulation factor may be considered as to be the strength of the influence of the transmit communication device on the electromagnetic radiation emitted by the radio radiation source.

Seeking to optimize the modulation depth respectively the modulation factor which is given at the receive communication device may provide the advantage that the effects of interference sources, which may be given within the communication path extending between the transmit communication device and the receive communication device, can be diminished by adjusting the levels of the time varying impedance in an appropriate manner. In connection with beamforming, receive directions being associated with a poor modulation factor can be fade out and radiation originating from directions being associated with a large modulation factor can be preferred.

The mentioned "entire radiation" may be given by the sum of (a) the "original radiation" emitted by the radio radiation source towards the receive communication device and received by the receive communication device and (b) the ambient backscatter radiation generated by the transmit communication device and received by the receive communication device. In this respect it is mentioned that in some scenarios for the summing of (a) and (b), (b) could also have a negative sign, resulting in an attenuation of the "entire radiation".

According to a further embodiment the method further comprises, at the receive communication device, filtering the received scattered and modulated electromagnetic radiation, wherein the demodulator unit demodulates the filtered received scattered and modulated electromagnetic radiation.

The described filtering may be carried out with an appropriate (narrow) band pass filter which is tuned to a basic or fundamental frequency of the transmit communication device. This may allow for applying in an easy and effective manner the well known principles of Fourier transformation in order to further optimize an effective Signal to Noise Ratio (SNR). Also here, the principles of beamforming can be applied which may further increase the quality of the ambient backscatter communication.

When the concept of beamforming is used, the phase shifts for the respective antenna elements of the transmit communication device should be adjusted in such a manner that the modulation factor at the receive communication device is maximized. In order to achieve this, a corresponding command signal can be transferred directly or indirectly from the receive communication device to the transmit communication device.

In the following there are described some possible characteristics of the circuit board which is comprised in the transmit communication device and/or in the receive communication device:

(A) The circuit board may have a layered structure comprising at least two dielectric layers each being sandwiched between respectively two metal layers. This means that the circuit board comprises an alternating sequence of metal layers and dielectric or insulating layers. Such a structure may also be denominated a Multi-layer board. Through holes or blind holes can be used for interconnecting different metal layers in order to increase the integration density in particular of signal traces formed on and/or within the base structure.

(B) The term "sandwiched" may refer to any layered structure wherein one (sandwiched) layer is located in between two (sandwiching) layers. Thereby, the sandwiched layer may be clamped with force or pressure by the sandwiching layer. However, also a simple middle or center location of the sandwiched layer is possible, where there is no force or pressure acting from the sandwiching layers onto the sandwiched layer.

(C) The layered structure may be configured as one of the group consisting of a printed circuit board, and a substrate. In the context of this document, the term "printed circuit board" (PCB) may particularly denote a plate-shaped bare component carrier which is formed by laminating several electrically conductive layer structures with several electrically insulating layer structures, for instance by applying pressure, if desired accompanied by the supply of thermal energy. As preferred materials for PCB technology, the electrically conductive layer structures are made of copper, whereas the dielectric or electrically insulating layer structures may comprise resin and/or glass fibers, so-called prepreg or FR4 material. The material used for the dielectric layers may comprises at least one of the group consisting of resin, in particular Bismaleimide-Triazine resin, cyanate ester, glass, in particular glass fibers, prepreg material, liquid crystal polymer, epoxy-based Build-Up Film, the above mentioned FR4 material, a ceramic, and a metal oxide. Although prepreg or FR4 are preferred, the other mentioned material or still other materials may be used as well.

(D) The various electrically conductive layer structures may be connected to one another in a desired way by forming through-holes through the laminate, for instance by laser drilling or mechanical drilling, and by filling them with electrically conductive material (in particular copper), thereby forming vias as through-hole connections. Apart from the described embedded active electronic component, a printed circuit board is usually configured for accommodating one or more electronic components on one or both opposing surfaces of the plate-shaped printed circuit board. They may be connected to the respective main surface by soldering.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless otherwise notified, in addition to any combination of features belonging to one type of subject matter also any combination between features relating to different subject matters is considered as to be disclosed with this document.

The aspects defined above and further aspects are apparent from the examples of embodiment to be described hereinafter and are explained with reference to the examples of embodiment. Embodiments of the invention will be described in more detail hereinafter with reference to examples of embodiment but to which the invention is not limited.

DETAILED DESCRIPTION OF ILLUSTRATED EMBODIMENTS

Figure 1A:
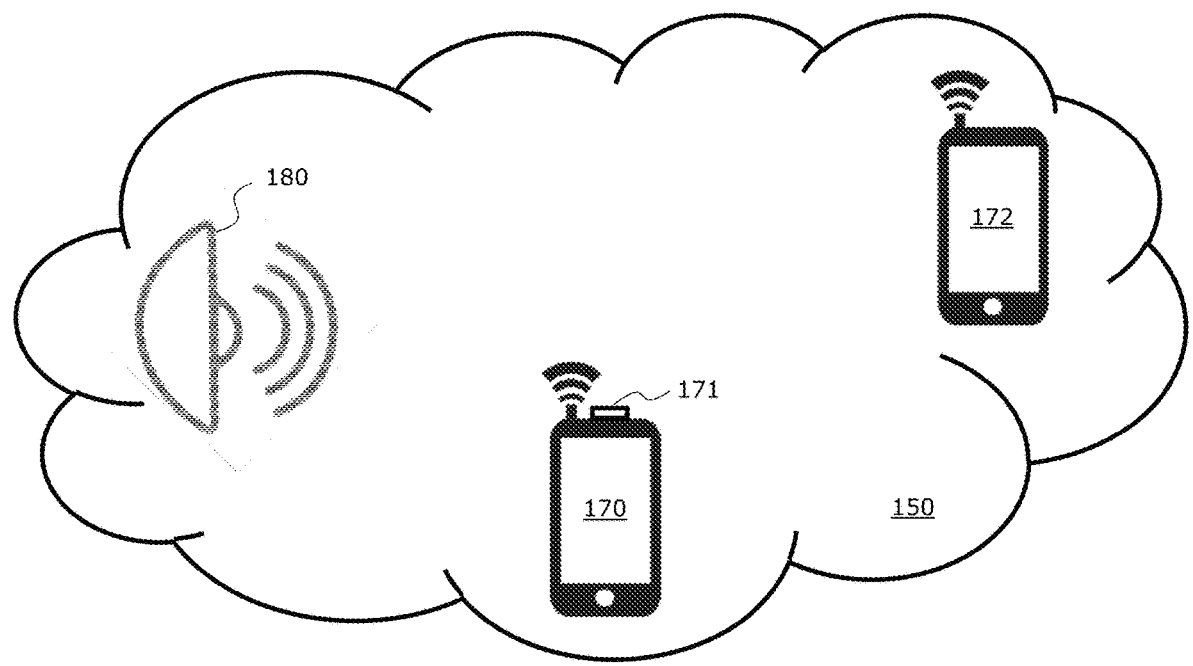
FIG. 1a shows a communication network comprising a radio radiation source and two radio communication devices each comprising a component carrier in accordance with an embodiment.

The illustrations in the drawings are presented schematically. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Further, spatially relative terms, such as "front" and "back", "above" and "below", "left" and "right", et cetera are used to describe an element's relationship to another element(s) as illustrated in the figures. Thus, the spatially relative terms may apply to orientations in use which differ from the orientation depicted in the figures. Obviously all such spatially relative terms refer to the orientation shown in the figures only for ease of description and are not necessarily limiting as an apparatus according to an embodiment can assume orientations different than those illustrated in the figures when in use.

FIG. 1a shows a radio communication network 150 comprising a radio radiation source 180 and two radio communication (end) devices, namely, a first electronic apparatus 170 and a second electronic apparatus 172. According to the embodiment described here each one of the electronic apparatuses 170, 172 comprises a component carrier in accordance with an embodiment. The radio radiation source 180 may be a network entity being separate from the two electronic apparatuses 170, 172. However, in some embodiments the radio radiation source 180 may be integrated within one of the two electronic apparatuses 170, 172.

With the described radio communication network 150 there may be accomplished an ambient backscatter (in other words an absorption-based) transmission of information between the two communication devices 170 and 172. Thereby, for instance the first communication device 170 absorbs certain radiation components (e.g. a time varying pattern and/or a frequency pattern), which radiation components encode the information being supposed to be transmitted to for instance to the second communication device 172. The corresponding transfer of pieces of information can be detected by the second communication device 172, which receives a correspondingly modified electromagnetic radiation. Descriptively speaking, the received electromagnetic radiation is the radiation emitted from the radio radiation source 180, wherein some absorbed radiation components are missing.

According to the exemplary embodiment described here the first communication device 170 comprises a sensor unit 171 which is configured for sensing a physical quantity from the environment of the first communication device 170. The obtained sensing data represent at least a part of the pieces of information which are transmitted to the second communication device 172. The sensed physical quantity may be for instance the temperature of the ambient environment of the first communication device 170. Of course, in case of a bidirectional ambient backscatter communication also the second communication device 172 may comprise a (not depicted) sensing unit.

Figure 1B:
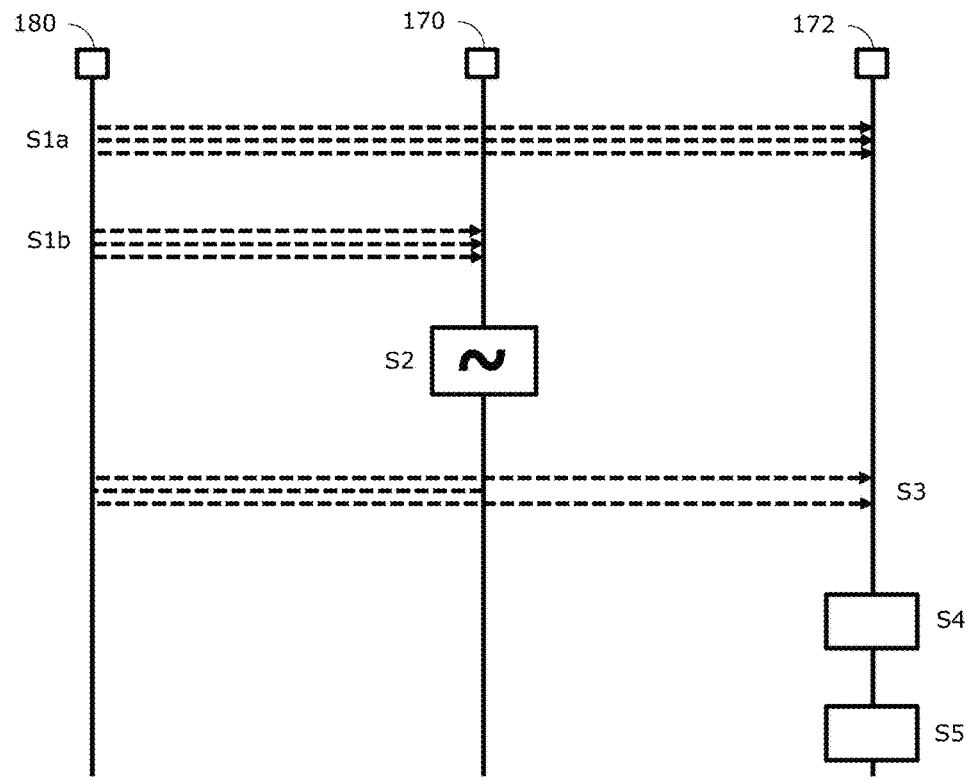
FIG. 1b shows a transaction flow diagram illustrating an absorption based data communication within the communication network of FIG. 1a from one radio communication device to the other radio communication device.

FIG. 1b shows a transaction flow diagram illustrating an example of such an absorption based data communication within the communication network 150 from the radio communication device 170 to the other radio communication device 172.

In two first steps S1a and S1b, which are carried out simultaneously, the radio radiation source emits electromagnetic radiation both to the first communication device 170 and to the second communication device 172.

In a second step S2 the first communication device 170 absorbs a part of the emitted electromagnetic radiation with a time varying pattern. This pattern is indicative for the pieces of information to be transmitted from the first communication device 170 to the second radio communication device 172.

In this document the first communication device 170 is also denominated a transmit communication device. Correspondingly, the second communication device 172 is denominated a receive communication device.

In a third step S3 the second communication device 172 receives the emitted electromagnetic radiation. This radiation is now modulated with the time varying pattern provided by the first radio communication device 170 because of a corresponding damping effect given when absorbing with the time varying pattern.

In a fourth step S4 the second communication device 172 evaluates respectively demodulates the time varying pattern of the modulation and in a fifth step S5 the second communication device 172 determines the pieces of information based on the result of evaluating.

It is mentioned that the described absorption based data communication relies inter alia on high sensitivities with regard to the detection of electromagnetic radiation. In particular, it is essential that "perturbations" caused by the selective absorption of the first communication device 170 can be detected by the second communication device 172. In order to comply with such sensitivity requirements a beamforming capability described above, which can be carried out also for receiving electromagnetic radiation by means of the first communication device 170 and/or the second communication device 172, may provide an essential contribution for realizing under real conditions the absorption based data communication described in this document.

Figure 2A:
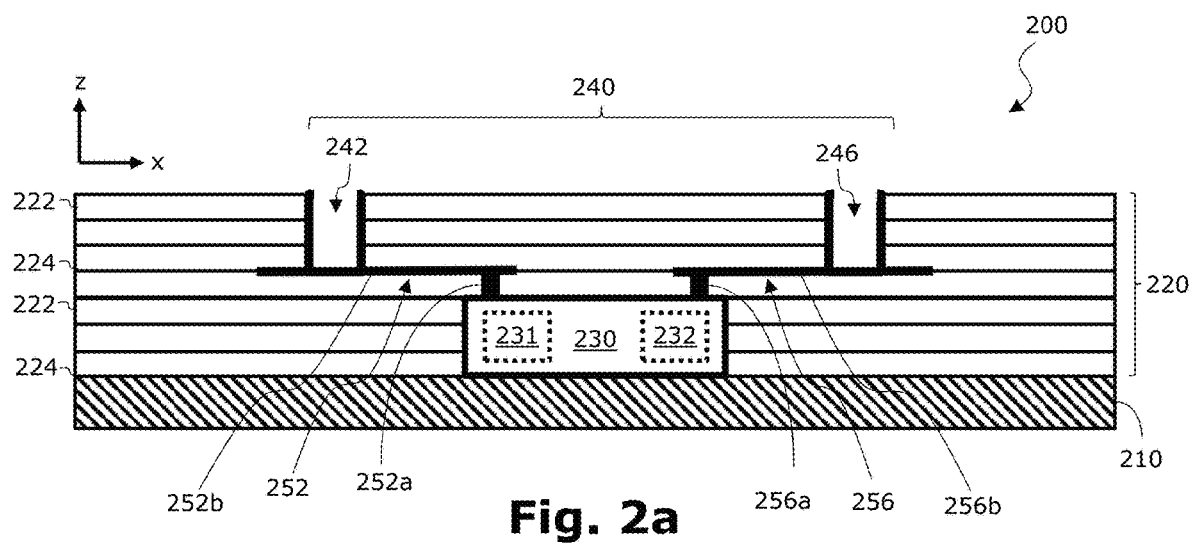
FIGS. 2a and 2b show a component carrier with two antenna elements each being realized by a metallized slot.
Figure 2B:
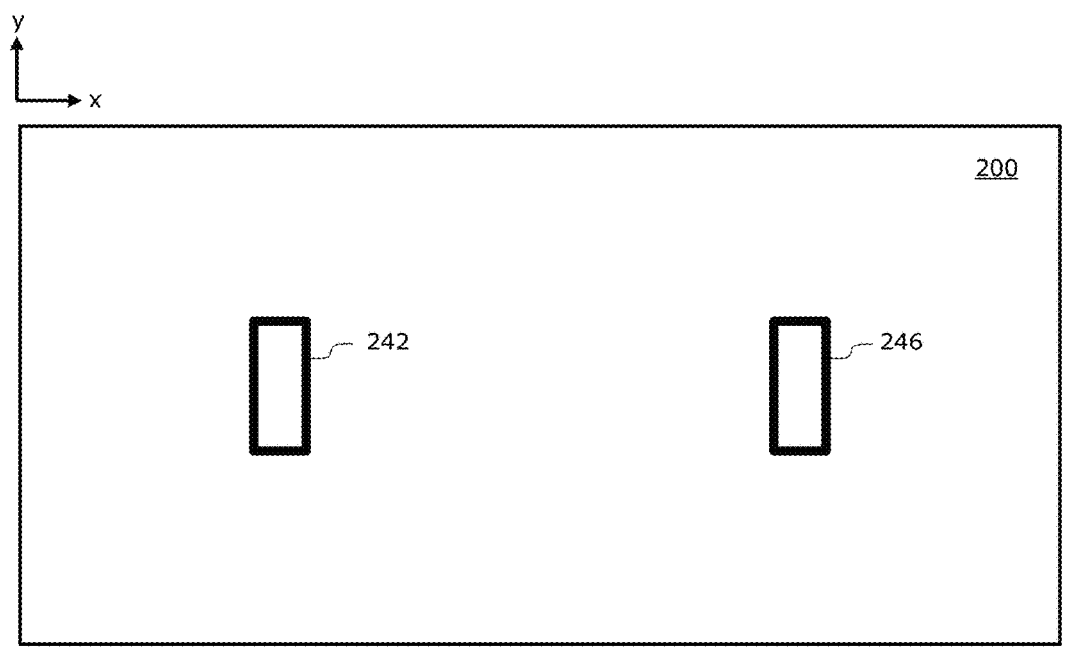

FIGS. 2*a* and 2*b* show a component carrier 200 which may be comprised by the first communication device 170 and/or the second communication device 172. The component carrier 200 comprises a core 210, which represents a backbone providing a certain mechanical stability for the component carrier 200. Above or over the core 210 there is formed a base structure 220 comprising an alternating sequence of dielectric layers 222 and electrically conductive respectively metallic layers 224. In this document the base structure 220 is also referred to as a laminate structure.

Within the base structure 220 and adjacent the core 210 there is provided an embedded electronic circuit 230. According to the exemplary embodiment described here this circuit is realized by an embedded active electronic component 230. In other embodiments the circuit respectively the component 230 is completely surrounded by the base structure 220, i.e. there is no mechanical contact between the component 230 and the core 210. In other embodiments, the embedded electronic component 230 is located within the core 210. In other embodiments there can be an additional structure (at least similar to the base structure 220) provided also at the other side of the core 210.

According to the exemplary embodiment described here the component carrier 200 allows for a bidirectional ambient backscatter communication of a communication device comprising the component carrier 200. Therefore, the electronic circuit 230 comprises a modulator unit 231 which is active in case the respective communication device operates as a transmit communication device. Correspondingly, the electronic circuit 230 comprises a modulator unit 232 which is active in case the respective communication device operates as a receive communication device.

The component carrier 200 further comprises an antenna arrangement 240, which is formed within an upper portion of the base structure 220. According to the embodiment described here the antenna structure 240 comprises two antenna elements, a first antenna element 242 and a second antenna element 246, which are realized by means of a first slot 242 and a second slot 246, respectively. As can be seen from FIG. 2*a* showing a cross section of the component carrier 200, the two slots 242 and 246 have the form of a blind opening. As can be seen from FIG. 2*b* showing a top view of the component carrier 200, each one of the two slots 242, 246 has a slightly elongated shape oriented along the y-direction.

The embedded electronic component 230 comprises several contact terminals (not depicted explicitly). One contact terminal is connected to the first antenna element 242 via a first conductor trace 252. The first conductor trace 252 comprises two straight conductor trace portions. According to the embodiment described here a first straight conductor trace portion is realized by means of a via 252*a* (extending in the vertical direction). The second straight conductor trace portion is realized by means of a portion 252*b* of a patterned metallic layer 224. Accordingly, the second conductor trace 256 comprises two straight conductor trace portions which are realized by means a via 256*a* and another portion 256*b* of the patterned metallic layer 224.

By means of the two conductor traces 252 and 256 the component 230 is operatively connected both with the first antenna element 242 and with the second antenna element 246. In other embodiments, there are additional functional elements or components inserted in the operative connection between the antenna elements 242, 246 and the component 230. The embedded electronic component 230 is an active electronic component which is capable of providing a first transmit signal to the first antenna element 242 and a second transmit signal to the second antenna element 246. Alternatively or in combination the active electronic component 230 is capable of processing a first receive signal received from the first antenna element 242 and a second receive signal received from the second antenna element 246.

As has been elucidated above in more detail the antenna arrangement 240 is a so called Phase Antenna Array (PAA) which is formed respectively embedded within the base structure 220. Of course, the PAA can also comprise further antenna elements. By appropriately operating the antenna element 242, 246 a beamforming can be achieved. Since the antenna elements 242, 246 can be used both for transmitting and receiving electromagnetic signals beamforming can be applied both for a transmitting radio communication end device and for a receiving radio communication end device.

Generally speaking, the component carrier 200 further comprises a first conductor trace 252 connecting the electronic component 230 with the first antenna element 242 and a second conductor trace 256 connecting the electronic component 230 with the second antenna element 246.

At least a part of at least one of the conductor traces 252, 256 may be realized by an appropriately patterned metallic layer of the base structure 220. This may provide the advantage that the interconnecting circuitry of the described component carrier may be realized by means of a well-established procedure which is known for instance for manufacturing printed circuit boards.

In this respect it is mentioned that a conductor trace connection may be realized directly via an appropriate conductor trace 252, 256 or indirectly via a further electronic component and at least one further conductor trace. The further electronic component may be embedded within or attached to the base structure 220.

In some embodiments the first conductor trace 252 and/or the second conductor trace 256 has a length of less than 600 mm, preferably less than 400 mm, more preferably less than 200 mm, more preferably less than 100 mm, more preferably less than 50 mm, more preferably less than 20 mm, more preferably less than 10 mm, and most preferably less than 5 mm. This may provide the advantage that the radio functionality of the component carrier 200 can be realized with an electronic assembly which can be built up within compact dimensions. This may be in particular of advantage for high frequency radio communication applications. A further advantage of short conductor traces 252, 256 is a small ohmic resistance which yields small losses of the electric signals travelling between the embedded active electronic component 230 and the respective antenna element 242, 246. Furthermore, a short conductor trace will typically exhibit a small capacitance and a small inductance. This results in a beneficial manner in a small amount of unwanted radio signals which are radiated by the respective conductor trace 252, 256. Therefore, there will be less unwanted interference with neighboring electronic devices even when operating the described component carrier with high frequency. In other words, with the help of short conductor traces the component carrier 200 will be characterized by a very good electromagnetic compatibility and a high sensitivity for receiving electromagnetic signals.

It is mentioned that in particular within buildings reflection tests have revealed that an excellent reflection suppression may be achieved for distances between different antenna elements 242, 246 which are in the range between 2 and 500 mm. Therefore, depending on the specific application it may not be necessary to exploit the entire spatial extension of the respective communication device in order to obtain an optimal ambient backscatter radio channel quality between two connected communication devices.

In some embodiments (a) the antenna arrangement 240 and the electronic component 230 are configured for operating at a predetermined wavelength and (b) at least one straight conductor trace portion 252a, 252b, 256a, 256b has a length which is less than ½, preferably less than ¼, more preferably less than ⅛, more preferably less than 1/16 mm, more preferably less than 1/32, and most preferably less than 1/64 of the predetermined wavelength.

Figure 3:
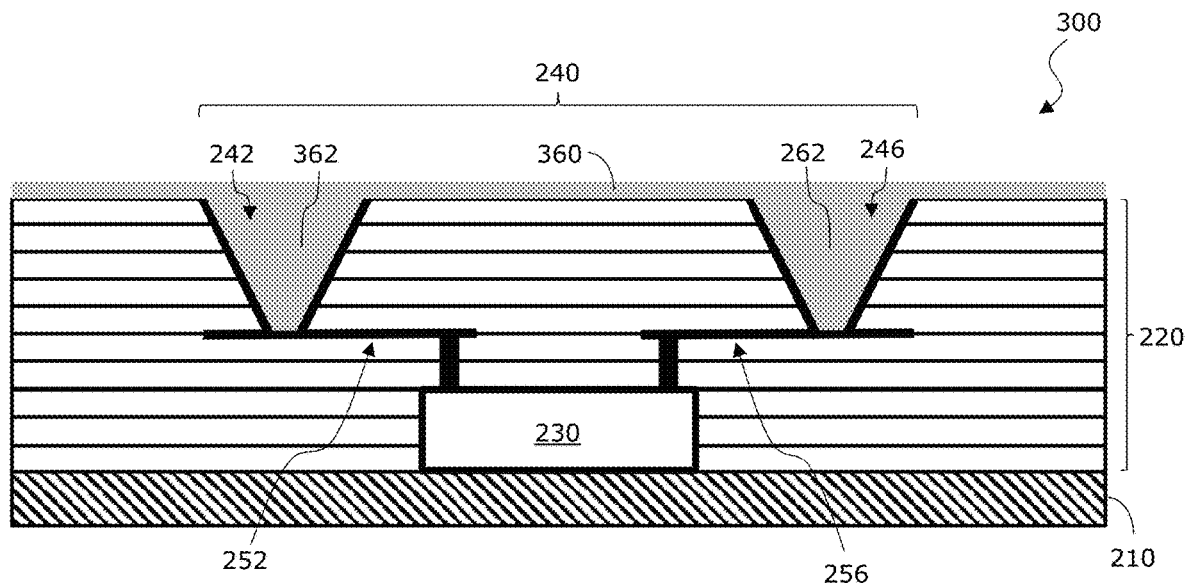
FIG. 3 shows a component carrier with two embedded cone shaped antenna elements which are covered with a protective coating.

FIG. 3 shows a component carrier 300 according to a further embodiment. By contrast to the component carrier 200 the component carrier 300 comprises an antenna arrangement 240, wherein the first antenna element 242 and the second antenna element 246 are realized by means of respectively a truncated cone being embedded in the base structure 220. Specifically, the antenna elements 242 and 246 are formed by means of a metallization of (a) the inner surface of a cone-shaped shell and (b) the bottom surface of the respective truncated cone shaped opening.

In further contrast to the component carrier 200 there is provided a protective structure at the upper surface of the base structure 220 respectively at the antenna arrangement 240. This protective structure comprises a protective coating 360 and a filling material 362 which has been inserted into the interior of the truncated cone shaped antenna elements 242, 246. According to the embodiment described here the material being used for the protective structure is a so called solder resist material which is widely used for manufacturing component carriers. However, also other materials such as a heat transfer paste, a flexi print material, a removable filling material, a paint and/or a lacquer can be used for the protective coating 360 and/or for the filling material 362.

Of course, the material of the protective coating 360 and/or the filling material 363 should be a non-conductive material which allows high frequency electromagnetic waves to pass with no or with only a very low attenuation. A suitable material may be basically any material which has a relative permittivity which is larger than 1, in particular larger than 1.5, more particular larger than 2, even more particular more than 2.5 and most particular more than 3. This non-conductive material may be for instance a non-metallic material or a material containing metals but being a bad conductor such as for example Aluminum oxide.

Figure 4:
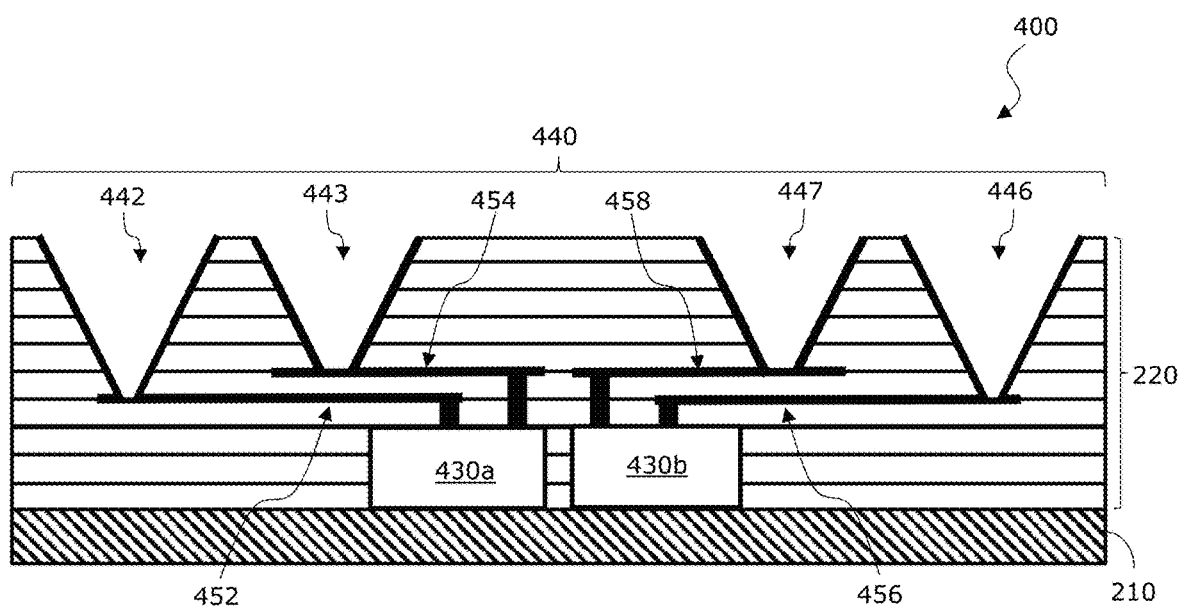
FIG. 4 shows a component carrier with an antenna arrangement comprising four cone shaped antenna elements and with two embedded electronic components being operatively connected with respectively two antenna elements.

FIG. 4 shows in accordance with a further embodiment a component carrier 400 with an PAA antenna arrangement 440 comprising four truncated cone shaped antenna elements, a first truncated cone shaped antenna element 442, a further first truncated cone shaped antenna element 443, a second truncated cone shaped antenna element 446, and a further second truncated cone shaped antenna element 447. In this embodiment two components 430a and 430b form an electronic circuit which is embedded within the laminated base structure 220 of the component carrier 400. In order allow for exploiting the directional characteristics offered by the PAA 440 the two embedded electronic components 430a and 430b are operatively connected with respectively two antenna elements 442, 443 respectively 446, 447. Specifically, the first antenna element 442 is connected with the component 430a via a first conductor trace 452. The further first antenna element 443 is connected with the component 430a via a further first conductor trace 454. Correspondingly, the second antenna element 446 is connected with the component 430b via a second conductor trace 456 and the further second antenna element 447 is connected with the component 430b via a further second conductor trace 458.

Furthermore, the two embedded electronic components 430a and 430b are communicatively connected with each other at least by means of a non-depicted data connection embedded within the base structure 420. This allows for a cooperative operation of the two components 430a and 430b in order to operate the entire antenna arrangement 440 in a proper manner such that the benefits of a PAA can be exploited.

Figure 5A:
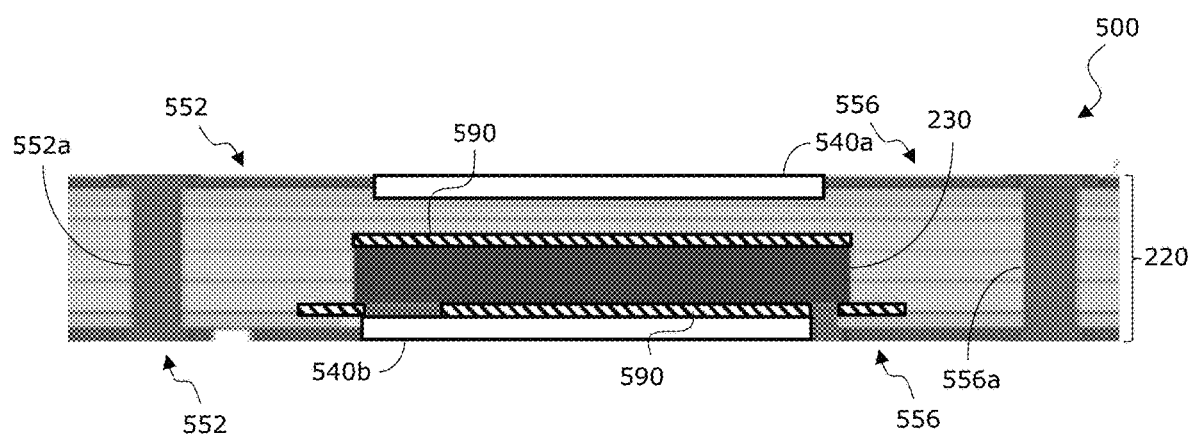
FIGS. 5a and 5b show a component carrier having two antenna assemblies formed on opposite sides.
Figure 5B:
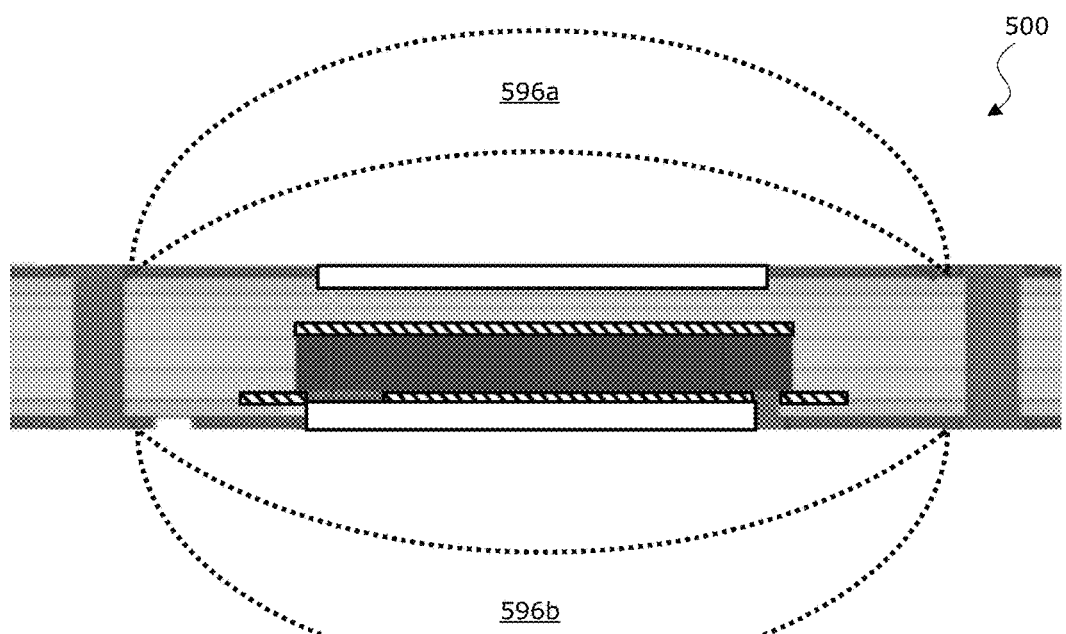

FIGS. 5a and 5b show a component carrier 500 which is comprised in communication devices in accordance with further embodiments. In accordance with component carriers described above, also the component carrier 500 comprises a laminated base structure 220 consisting of an alternating sequence of metal layers and dielectric or insulating layers. Further, an electronic circuit 230 comprising at least one of a modulator unit and a demodulator unit (not depicted) is embedded within the base structure 220.

As can be best seen from FIG. 5a, two antenna assemblies, a first antenna assembly 540a and a second antenna assembly 540b are provided at opposite sides of the component carrier 500. According to the exemplary embodiment described here the antenna assemblies 540a and 540b are embedded or integrated in respectively a surface portion of the component carrier 500.

The first antenna assembly 540a being provided at the top is connected with the electronic circuit 230 by means of two conductor traces, a first conductor trace 552 and a second conductor trace 556. The first conductor trace 552 comprises a straight conductor trace portion being realized by means of a via 552a. Correspondingly, the second conductor trace 556 comprises a via 556a. The antenna assembly 540b being provided at the bottom of the component carrier 500 is connected to the electronic circuit 230 via very short and not depicted conductor traces.

Further, a shielding structure 590 is embedded within the laminated base structure 220. According to the exemplary embodiment described here the shielding structure 590 covers a top surface and a bottom surface of the electronic circuit 230. Of course, the shielding structure 590 could also cover the side surfaces of the electronic circuit 230. The shielding structure 590 significantly reduces electromagnetic radiation impinging onto respectively into the component carrier 500. As a result, unwanted interferences between such an external electromagnetic radiation and a proper operation of the electronic circuit 230 can be minimized.

As can be seen from FIG. 5b, arranging the two antenna assemblies 540a and 540b at two opposite sides of the component carrier 500 and further arranging the embedded electronic circuit 230 in between the two antenna assemblies 540a may allow for an unobscured ambient backscatter communication into and/or from all angular directions which are included within a full sphere. Thereby, one hemisphere is covered by the first antenna assembly 540a and the remaining second hemisphere is covered by the second antenna assembly 540b. The corresponding angular regions allowing for ambient backscatter communication are illustrated with reference numerals 596a and 596b.

Figure 6:
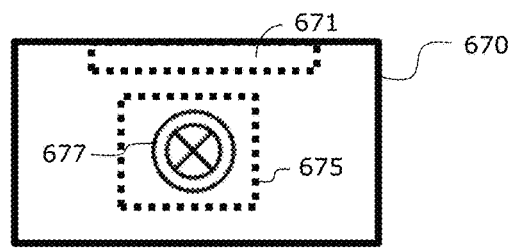
FIG. 6 shows a communication device comprising an energy harvesting system.

FIG. 6 shows in a schematic illustration a communication device 670 comprising a sensor unit 671 and an energy harvesting system 675. For the sake of a simple illustration RF equipment such as antenna arrangement(s) and electronic circuit is not depicted.

The energy harvesting system 675 comprises an energy conversion arrangement 677 which converts mechanical energy into electric energy being used for operating a not depicted electronic circuit for ambient backscatter communication. According to the embodiment described here the energy conversion arrangement 677 comprises a pushbutton and a piezoelectric system being mechanically connected thereto. Upon pressing the pushbutton measurement data from a sensor unit 671 measuring a physical quantity such as e.g. the ambient pressure are transmitted by the communication device 670 via ambient backscatter communication. The energy or power being needed for the ambient backscatter communication and/or for sensing the physical quantity can be obtained from the energy conversion arrangement 677 which has converted the mechanical energy provided by a user pressing the pushbutton. As a result, the described communication device 670 can operate with no or with only a very weak internal or external power supply.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

LIST OF REFERENCE SIGNS 150 communication network/communication system
170 first electronic apparatus/first communication device
171 sensor unit
172 second electronic apparatus/second communication device
180 radio radiation source
200 component carrier
210 core
220 base structure/laminate
222 dielectric layer
224 metallic layer
230 embedded electronic component/embedded electronic circuit
231 modulator unit
232 demodulator unit
240 antenna arrangement/Phased Antenna Array (PAA)
242 first antenna element/first slot
246 second antenna element/second slot
252 first conductor trace
252a via/straight conductor trace portion
252b patterned metallic layer portion/straight conductor trace portion
256 second conductor trace
256a via/straight conductor trace portion
256b patterned metallic layer portion/straight conductor trace portion
300 component carrier
347 antenna element
360 protective coating/solder resist
362 filling material/solder resist
363 filling material
400 component carrier
420 base structure
430a embedded electronic component
430b embedded electronic component
440 antenna arrangement/Phased Antenna Array (PAA)
442 first antenna element
443 further first antenna element
446 second antenna element
447 further second antenna element
452 first conductor trace
454 further first conductor trace
456 second conductor trace
458 further second conductor trace
500 component carrier
540a first antenna assembly
540b second antenna assembly
552 first conductor trace
552a via/straight conductor trace portion
556 second conductor trace
556a via/straight conductor trace portion
590 shielding structure
596a ambient backscatter communication region
596b ambient backscatter communication region
670 communication device
671 sensor unit
675 energy harvesting system
677 energy conversion arrangement

The invention claimed is:

1. A communication device for participating in an ambient backscatter communication as a transmit communication device, the communication device, comprising:
   an antenna arrangement configured for scattering electromagnetic radiation, which has been emitted by a radio radiation source, towards a receive communication device;
   an electronic circuit having a modulator unit coupled with the antenna arrangement and configured for modulating an impedance of the antenna arrangement in accordance with pieces of information to be transferred from the transmit communication device to the receive communication device; and
   a component carrier, wherein at least a part of the antenna arrangement and/or at least a part of the electronic circuit is embedded within the component carrier;
   wherein the antenna arrangement comprises:
   a first antenna assembly being formed at a first surface of the component carrier; and
   a second antenna assembly being formed at a second surface of the component carrier, wherein the second surface is opposite to the first surface,
   wherein the first antenna comprises at least two first antenna elements and/or the second antenna assembly comprises at least two second antenna elements.

2. The communication device as set forth in claim 1, further comprising:
   a demodulator unit coupled with the antenna arrangement and configured for demodulating received ambient backscattered radiation from another communication device to retrieve pieces of information which have been transferred from the another communication device; and/or
   a sensor unit, which is coupled with the electronic circuit, the sensor unit configured for sensing the value of a physical quantity.

3. The communication device as set forth in claim 1, wherein the antenna arrangement comprises at least a first antenna element and a second antenna element, whereby
   the electronic circuit is operatively connected both with the first antenna element and with the second antenna element, and
   the electronic circuit is configured for (a) introducing a first phase shift for signals traveling between the electronic circuit and the first antenna element; and/or for (b) introducing a second phase shift for signals traveling between the electronic circuit and the second antenna element.

4. The communication device as set forth in claim 1, wherein the electronic circuit comprises an active electronic component, which is embedded within the component carrier.

5. The communication device as set forth in claim 1, wherein the component carrier is a flexible component carrier or a semi-flexible component carrier.

6. The communication device as set forth in claim 1, further comprising:
an energy conversion arrangement, which is configured for converting provided external energy into internal energy used for driving the electronic circuit.

7. A communication device for participating in an ambient backscatter communication as a receive communication device, the communication device, comprising:
an antenna arrangement configured for receiving ambient backscattered radiation from a transmit communication device;
an electronic circuit having a demodulator unit coupled with the antenna arrangement and configured for demodulating the received ambient backscattered radiation to retrieve pieces of information which have been transferred from the transmit communication device to the receive communication device; and
a component carrier, wherein at least a part of the antenna arrangement and/or at least a part of the electronic circuit is embedded within the component carrier;
wherein the antenna arrangement comprises
a first antenna assembly being formed at a first surface of the component carrier; and
a second antenna assembly being formed at a second surface of the component carrier, wherein the second surface is opposite to the first surface,
wherein the first antenna assembly comprises at least two first antenna elements and/or the second antenna assembly comprises at least two second antenna elements.

8. The communication device as set forth in the claim 7, further comprising:
a modulator unit coupled with the antenna arrangement and configured for modulating an impedance of the antenna arrangement in accordance with pieces of information to be transferred to another communication device.

9. The communication device as set forth in claim 7, wherein the antenna arrangement comprises at least a first antenna element and a second antenna element, whereby
the electronic circuit is operatively connected both with the first antenna element and with the second antenna element, and
the electronic circuit is configured for (a) introducing a first phase shift for signals traveling between the electronic circuit and the first antenna element; and/or for (b) introducing a second phase shift for signals traveling between the electronic circuit and the second antenna element.

10. The communication device as set forth in claim 7, wherein the electronic circuit comprises an active electronic component, which is embedded within the component carrier.

11. The communication device as set forth in claim 7, wherein the first antenna assembly comprises at least two first antenna elements and/or the second antenna assembly comprises at least two second antenna elements.

12. The communication device as set forth in claim 7, wherein the component carrier is a flexible component carrier or a semi-flexible component carrier.

13. The communication device as set forth in claim 7, further comprising:
an energy conversion arrangement, which is configured for converting provided external energy into internal energy used for driving the electronic circuit.

14. A communication system, comprising:
a radio radiation source being configured for emitting electromagnetic radiation;
a transmit communication device having
an antenna arrangement configured for scattering electromagnetic radiation emitted by the radio radiation source,
an electronic circuit with a modulator unit coupled to the antenna arrangement, the modulator unit modulating an impedance of the antenna arrangement in accordance with information to be communicated, and
a component carrier, where at least a part of the antenna arrangement and/or at least a part of the electronic circuit is embedded within the component carrier; and
a receive communication device having
an antenna arrangement configured for receiving ambient backscattered radiation from the transmit communication device,
an electronic circuit with a demodulator unit coupled with the antenna arrangement and configured for demodulating the received ambient backscattered radiation to retrieve pieces of information transferred from the transmit communication device to the receive communication device; and
a component carrier, wherein at least a part of the antenna arrangement and/or at least a part of the electronic circuit is embedded within the component carrier,
wherein at least two of the transmit communication device, the receive communication device, and the radio radiation source are arranged within one electronic apparatus.

15. The communication system as set forth in claim 14, wherein at least two of the transmit communication device, the receive communication device, and the radio radiation source share one and the same component carrier.

16. The communication system as set forth in claim 14, further comprising:
at least one further receive communication device communicatively connected with the transmit communication device by the ambient backscatter radiation received from the transmit communication device,
the at least one further receive communication device having
an antenna arrangement configured for receiving ambient backscattered radiation from the transmit communication device,
an electronic circuit with a demodulator unit coupled with the antenna arrangement and configured for demodulating the received ambient backscattered radiation to retrieve pieces of information transferred from the transmit communication device to the receive communication device; and
a component carrier, wherein at least a part of the antenna arrangement and/or at least a part of the electronic circuit is embedded within the component carrier.

17. A method for transferring pieces of information within a communication network which comprises a radio radiation source, a transmit communication device, and a receive communication device, the method comprising:
- emitting, with a radio radiation source, electromagnetic radiation;
- scattering, with an antenna arrangement of the transmit communication device, emitted electromagnetic radiation impinging onto the transmit communication device towards the receive communication device, wherein the scattering is modulated by the modulator unit with a time varying pattern of the impedance of the antenna arrangement of the transmit communication device, wherein the time varying pattern is indicative for the pieces of information;
- receiving, with an antenna arrangement of the receive communication device, the scattered and modulated electromagnetic radiation;
- demodulating, with the demodulator unit, the received scattered and modulated electromagnetic radiation; and
- retrieving the pieces of information based on the result of demodulating;

wherein the transmit communication device has
- the antenna arrangement configured for scattering electromagnetic radiation emitted by the radio radiation source,
- an electronic circuit with a modulator unit coupled to the antenna arrangement, the modulator unit modulating an impedance of the antenna arrangement in accordance with information to be communicated, and
- a component carrier, where at least a part of the antenna arrangement and/or at least a part of the electronic circuit is embedded within the component carrier, wherein the receive communication device has
- the antenna arrangement configured for receiving ambient backscattered radiation from the transmit communication device,
- an electronic circuit with a demodulator unit coupled with the antenna arrangement and configured for demodulating the received ambient backscattered radiation to retrieve pieces of information transferred from the transmit communication device to the receive communication device; and
- a component carrier, wherein at least a part of the antenna arrangement and/or at least a part of the electronic circuit is embedded within the component carrier, wherein the antenna arrangement of the transmit communication device and/or the antenna arrangement of the receive communication device comprises
- a first antenna assembly being formed at a first surface of the component carrier; and
- a second antenna assembly being formed at a second surface of the component carrier, wherein the second surface is opposite to the first surface, wherein the first antenna assembly comprises at least two first antenna elements and/or the second antenna assembly comprises at least two second antenna elements.

18. The method as set forth in claim 17, wherein the transmit communication device and the receive communication device are spatially separated from each other by a distance of less than 2000 m; and/or
- wherein the transmit communication device and/or the receive communication device operate with a power consumption of less than 100 µW; and/or
- wherein the emitted electromagnetic radiation has a frequency bandwidth of less than 1 GHz.

19. The method as set forth in claim 18,
- wherein modulating the impedance of the antenna arrangement of the transmit communication device comprises modulating a strength of absorption of at least a part of the emitted electromagnetic radiation with the time varying pattern; and/or
- modulating the impedance of the antenna arrangement of the transmit communication device comprises modulating a frequency of absorption of at least a part of the emitted electromagnetic radiation with the time varying pattern; and/or
- wherein, at the transmit communication device, impedance values of the time varying pattern of the impedance are chosen such that a modulation depth of the entire radiation received by the receive communication device is maximized; and/or
- wherein the method further comprises, at the receive communication device, filtering the received scattered and modulated electromagnetic radiation, wherein the demodulator unit demodulates the filtered received scattered and modulated electromagnetic radiation.

* * * * *

UNITED STATES PATENT AND TRADEMARK OFFICE
CERTIFICATE OF CORRECTION

PATENT NO. : 10,713,450 B2
APPLICATION NO. : 15/868790
DATED : July 14, 2020
INVENTOR(S) : Urs Hunziker Page 1 of 1

It is certified that error appears in the above-identified patent and that said Letters Patent is hereby corrected as shown below:

In the Claims

Column 26, Line 25 - "18" should be "17".

Signed and Sealed this
Third Day of November, 2020

Andrei Iancu
*Director of the United States Patent and Trademark Office*